United States Patent [19]

Taschero

[11] Patent Number: 4,809,943

[45] Date of Patent: Mar. 7, 1989

[54] SUPPORT AND RETENTION DEVICE FOR LUGGAGE-RACK BARS FOR MOTOR VEHICLES

[75] Inventor: Giuseppe Taschero, Volvera, Italy

[73] Assignee: La Prealpina S.r.l., Turin, Italy

[21] Appl. No.: 105,622

[22] Filed: Oct. 7, 1987

[30] Foreign Application Priority Data

Oct. 20, 1986 [IT] Italy .................. 53981/86[U]
Nov. 27, 1986 [IT] Italy .................. 54132/86[U]

[51] Int. Cl.$^4$ .................................................. B60R 9/00
[52] U.S. Cl. ................................ 248/503; 248/553; 224/329
[58] Field of Search ............. 248/553, 503, 510; 224/329–331; 211/175

[56] References Cited

U.S. PATENT DOCUMENTS 3,325,069  6/1967  Fulton ..................... 224/330 X
4,586,638  5/1986  Proscott et al. ............. 224/329
4,684,049  8/1987  Maby et al. ................ 224/329
4,705,198 11/1987  Kamaya .................... 224/329

FOREIGN PATENT DOCUMENTS 208109  3/1940  Switzerland ................. 224/231

Primary Examiner—Alvin C. Chin-Shue
Attorney, Agent, or Firm—Guido Modiano; Albert Josif

[57] ABSTRACT

This support and retention device, which is easy to install, extremely safe and structurally efficient and has low costs, comprises, for each bar, a pair of uprights including each a box-like structure; an upper through seat in the box-like structure for receiving therein a different end of the bar; a bolt at the seat for locking the bar to the box-like structure; a resting foot pivoted to the box-like structure; a slidable plate accommodated inside the box-like structure, movable substantially vertically and having a lower folded end protruding from the box-like structure for engaging an undercut profile of the vehicle bodywork; and an oscillatable element pivoted inside the box-like structure and controlled by the head of a screw engaging in one end portion of a transverse tension element extending between the pair of uprights of structural and mechanical connection thereof. The oscillatable element engages a portion of the slidable plate so that, by tightening the screw, first the uprights are caused to slide along the bar for mutual positioning thereof, then, upon locking the uprights to the bar through the bolts, the slidable plates are subjected to vertical traction and engage with their end of undercuts of the vehicle bodywork.

6 Claims, 3 Drawing Sheets

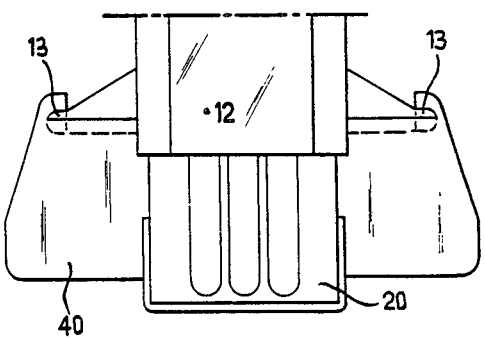
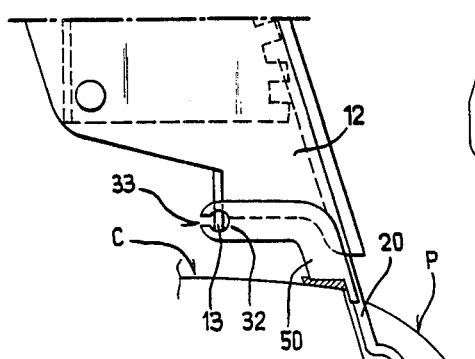
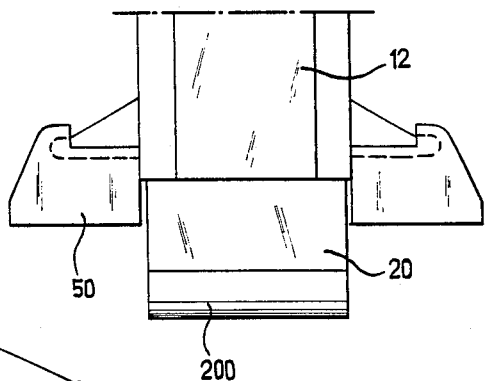
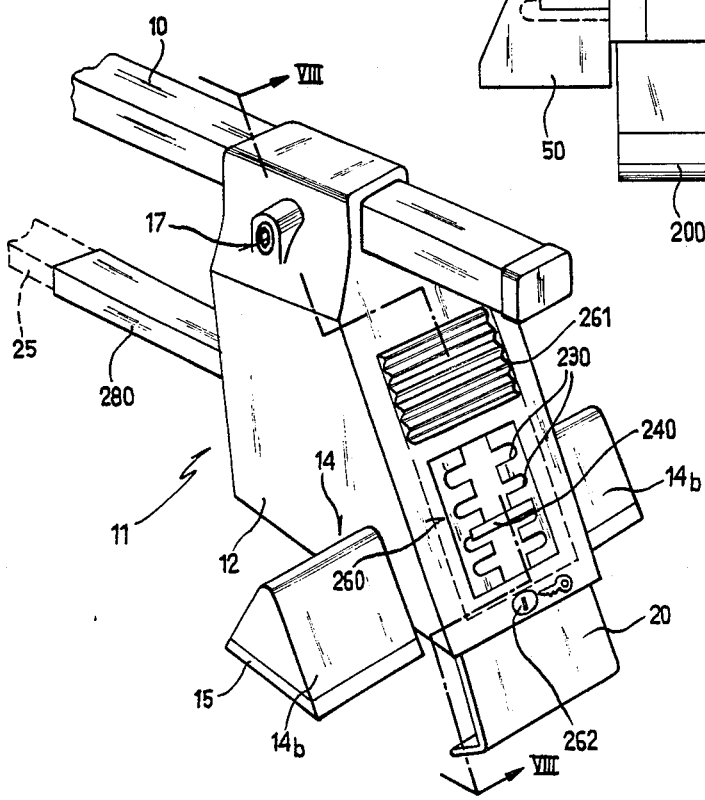

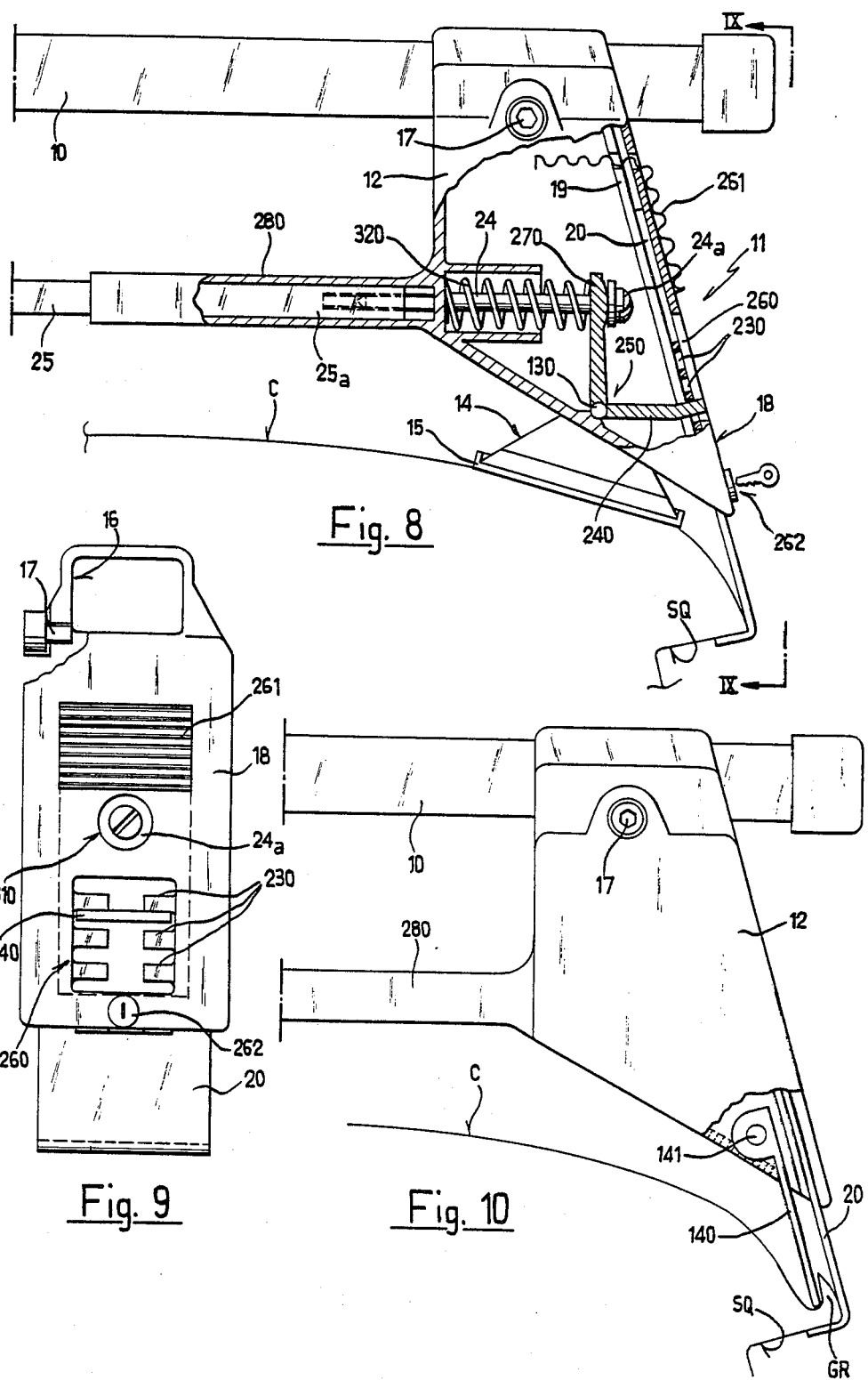

SUPPORT AND RETENTION DEVICE FOR LUGGAGE-RACK BARS FOR MOTOR VEHICLES

BACKGROUND OF THE INVENTION

The present invention relates to a support and retention device for luggage-rack bars, so-called carryall bars, adapted to allow the installation of said bars both on motor vehicles equipped with lateral driprails and on more recent motor vehicles which are not equipped therewith. For this second type of motor vehicle, it is very important that the support and retention device be capable of exerting a firm locking of the resting feet of the uprights against the roof sheet of the motor vehicle and at the same time that this device be able to ensure that the uprights are and remain correctly arranged transversely so as to correspondingly ensure the correct and constant hooking of the locking element of each upright onto the undercut profile of the bodywork with which said locking element engages.

For this purpose, devices are known in which the locking force is used both to produce and maintain the forced resting of the feet of the uprights on the roof of the motor vehicle, and to produce the transverse sliding of each pair of counterposed uprights with respect to the related bar so as to also obtain transverse locking.

These known devices, however, have not produced satisfactory results since they are unable to oppose effectively the transverse thrust which is transmitted to the uprights as an effect of the deformation of the bars produced by the load. Consequently, the loading capacity of the bars is considerably reduced, and the safety against accidental uncoupling of the supports while the vehicle is moving is not satisfactory.

SUMMARY OF THE INVENTION

The aim of the present invention is to eliminate these disadvantages and to provide a device which is easy to install, extremely safe and structurally efficient, having a low cost and an improved aesthetical appearance.

Within this general aim, the present invention has the important particular object of providing a device which allows both the self-adjustment of the transverse distance between the supports of each bar—and therefore the correct transverse locking of said supports on the roof of any motor vehicle—and the effective absorption of the transverse thrust which is transmitted to the supports due to the load, preventing said thrust from comprising the transverse locking carried out with no load.

Another particular and important object of the present invention is to provide a supporting device comprising easily operatable locking means effectively protected both against the weather, which tends to cause their oxidation, and against any tampering.

Moreover, an object of the invention is to provide a device with easily interchangeable resting means which are adapted to allow its installation on different types of motor vehicles, and more precisely on motor vehicles without outer lateral driprails, on motor vehicles equipped with said driprails and also on motor vehicles with so-called wraparound doors.

These important aim and objects, and others which become apparent from the following detailed description, are attained by the support and retention device for luggage-rack bars, as defined in the appended claims.

BRIEF DESCRIPTION OF THE DRAWINGS

The characteristics and advantages of the invention will become apparent from the following detailed description and with reference to the accompanying drawings, given only by way of non-limitative example, wherein:

FIGS. 3 and 4 are partial lateral and front views of the device equipped with resting means adapted for motor vehicles having lateral driprails;

FIGS. 5 and 6 are views, similar to those of FIGS. 3 and 4, illustrating the device equipped with resting means adapted for motor vehicles with wraparound doors;

FIG. 7 is a perspective view of the device according to a different embodiment of the invention;

FIG. 8 is a partial longitudinal cross section view taken along the line VIII—VIII of FIG. 7;

FIG. 9 is a lateral elevation view, in partial cross section, view in the direction of the arrows IX—IX of FIG. 8; and FIG. 10 is a partial cross section view, similar to that of FIG. 8, illustrating another embodiment of the invention.

DESCRIPTION OF THE PREFERRED EMBODIMENTS

Figure 1:
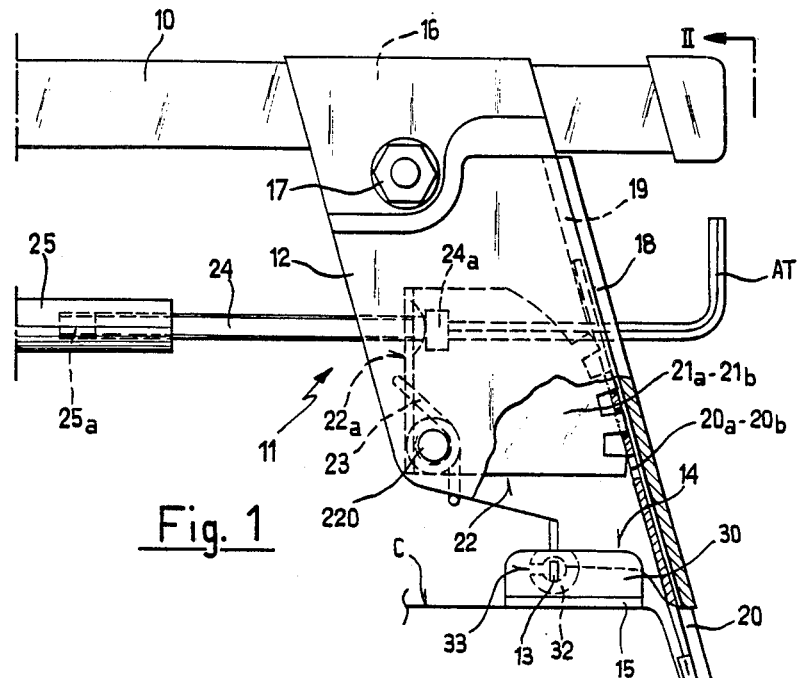
FIG. 1 is a front elevation view of the device according to an advantageous embodiment of the invention; the device being illustrated with resting means adapted for driprail-less motor vehicles.
Figure 2:
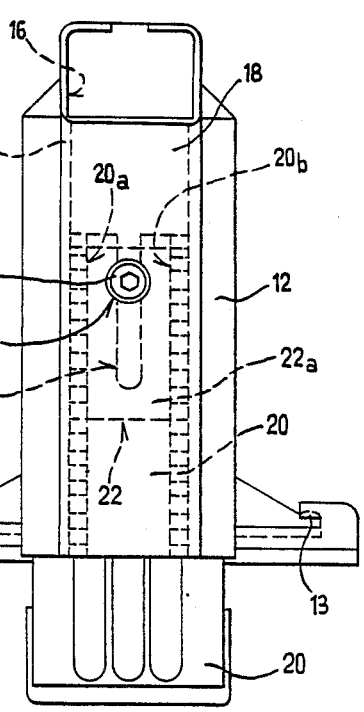
FIG. 2 is a lateral elevation view in the direction of the arrows II—II of FIG. 1.

With initial reference to FIGS. 1 to 6, 10 indicates a transverse luggage-rack bar, of the so-called carryall type, which is supported and rigidly associated with the bodywork C of the vehicle by means of a counterposed pair of support and retention uprights 11 arranged at its ends.

According to the present invention each upright 11 comprises a box-like structure 12, advantageously in stamped sheet metal or in light alloy obtained by die-casting, having a foot 14, pivoted thereto by means of a pair of rectangular pivots 13, for resting on the bodywork C, the foot 14 being provided with a sole 15 in elastically yielding material.

The box-like structure 12 is upwardly-provided with a seat 16 accommodating therethrough the corresponding end of the bar 10 which is freely slidable in axial direction. A bolt 17 traverses the structure 12 proximate to the seat 16 and allows locking of the bar 10, after the adjustment of the transverse positioning of the supports 11, as will be explained hereinafter.

The lateral wall 18 of the structure 12 is provided, in its interior, with two counterposed retention and sliding guides 19 for a slidable plate 20 which protrudes downwardly from the structure and has an end 200 folded at a right angle to engage a corresponding undercut profile SQ of the bodywork C. Two toothed portions 20a–20b (see in particular FIG. 2) are provided on the plate 20, and advantageously consist of two series of adjacent holes with tooth-like arrangement or of two racks arranged side by side. Correspondingly toothed circular sectors 21a–21b, provided on the lateral edges of the arms of an oscillatable element 22 having a U-shaped profile, connected to the structure 12 by means of a pivot 220 and subject to a return spring 23, engage with said toothed portions. The central wall 22a of the element 22 is provided with a hole passed by a screw 24 the hollow head 24a whereof abuts against the wall 22a and the threaded portion whereof engages in a complementarily threaded seat 25a provided at one end of a transverse and horizontal traction element 25 arranged below, and parallel to the bar 10. The traction element 25, which is adapted to absorb the transverse stresses which the bar, stressed by the weight it bears, discharges onto the uprights 11, has its other end directly pivoted to the corresponding oscillatable element of the opposite upright 11 and therefore also defines a mechanical connection between the oscillatable elements 22. The screw 24 can be operated by means of a tool AT which is caused to pass in a hole 24b provided on the lateral wall 18 of the structure and in a slot of the plate 20; the hole being closed by a plug lock (not illustrated).

The arrangement is such that tightening of the screw 24, by virtue of the action of the head 24a against wall 22a, auses first a movement of both structures 12 with respect to the bar 10 (to the left with reference to FIG. 1) which is intended to correctly locate the uprights 11 on the bar so as to fit the transverse dimension of the bodywork. Subsequently, after locking the bolts 17 of both uprights, by continuing to tighten the screw 24, the rotation of the sectors 21a-21b is caused, with the consequent and simultaneous rise of the plates 20 which stably engage the undercuts SQ with their ends 200.

As is clearly illustrated in FIG. 1, the tightening reaction discharges, in the case of motor vehicle not equipped with lateral driprails, on the foot 14 which is associated with the pivots 13 in an oscillatable and removable manner. For this purpose, the foot comprises a plate 30 provided, at the ends, with cylindrical seats 32 accommodating the ends of the pivots 13, the cylindrical seats 32 having lateral openings 33 through which it is possible to engage and disengage the rectangular pivots 13 after rotating the plate 30 through approximately 90° with respect to its working position, to thereby remove the plate 30.

Figure 3:
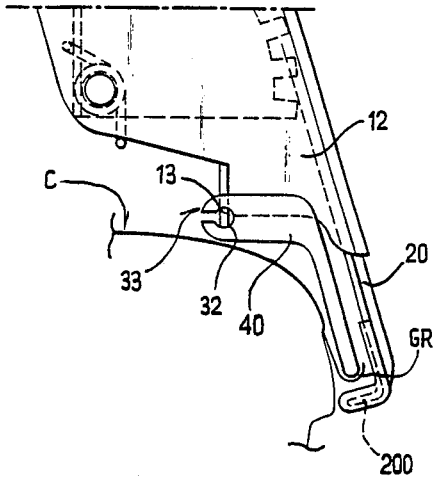

The removability of the plate 30 and the particular configuration of the pivots 13 and of the open seats 32 allows the rapid replacement of said plate with plates 40 and 50 which are similar and similarly associated, in order to adapt the device to motor vehicles with lateral driprails GR and respectively to motor vehicles with wraparound doors P as illustrated in detail in FIG. 3, 4 and respectively 5, 6.

According to the different embodiment of FIGS. 7 to 9, wherein similar or corresponding parts are indicated by the same reference numerals, the plate 20, slidable in the guides 19 of the box-like structure 12, is provided with a plurality of through slots 230 adapted to selectively receive the end of the first arm 240 of an L-shaped lever 250 pivoted, freely oscillatable, to the structure 12. Advantageously, the lever 250 is centrally pivoted to the structure 12 by means of a pivot 130 whereto also the resting foot 14 is provided, the foot 14 including here two oscillatable foot portions 14a-14b arranged to the sides of the box-like structure and each provided with a sole 15 is elastically yielding material.

A port 260, provided on the wall 18 of the structure 12, allows access to the end of the arm 240 for effecting engagement thereof with one of various slots 230 for adjustment. The port 260 is advantageously hidden by a shutter 261 provided with a closure lock 262.

The second arm 270 of the lever 250 has its end aligned with a through seat 280 provided on the structure 12 and intended to slidably contain the corresponding end of the transverse traction element 25. The screw 24 engages in the threaded seat 25a of the traction element and passes through a hole of the arm 270 whereon it abuts with its own head 24a, which can be accessed from outside by means of a hole 310 provided on the wall 18 above port 260 and aligned with the screw 24 (FIG. 9). The seat 280 is provided monolithically with the structure 12 and receives the end of the traction element 25 with considerable play, which allows to compensate the deviations from parallelism between the traction element and the bar 10.

However, the seat 280 need not be rigid with the structure 12, but may be connected and in particular pivoted thereto, and in this case the coupling with the traction element 25 can be precise; the deviations from parallelism being compensated by the relative movement of the seat 280 with respect to the structure 12. A spring 320 is inserted on the stem of the screw 24 and abuts on one side on the inner wall of the structure 12 and on the other side on the arm 270 of the lever 250.

The described device is installed with its foot 14 in resting engagement on the roof of the bodywork C and with both screws 17 and 24 slackened, after having previously and approximately adjusted the length of the protruding part of the plate 20 by means of the engagement of the arm 240 in an adapted slot 230, so that the end 200 of said plate is below the undercut SQ. Subsequently, by means of an adapted tool, the screw 24 is tightened and initially causes the sliding of the uprights 11 with respect to the bar 10 and then the correct transverse positioning thereof.

At this point the screw 17 of both uprights is locked and the locking operation is continued on the screw 24, which, by screwing in the traction element 25, causes the rotation of the levers 250 of both uprights (anticlockwise with reference to FIG. 8), and the consequent upward movement of the plates 20, the ends 200 whereof stably engage the undercuts SQ.

In the different embodiment illustrated in FIG. 10, adapted for motor vehicles having a lateral driprail GR, the resting element 14, instead of being composed of the previously described foot, comprises a plate 140 pivoted at 141 to the structure 12 and adapted to engage, with its free end, said driprail GR.

I claim:

1. Support and retention device for luggage-rack bars for motor vehicles, comprising, for each bar, a pair of uprights including each a box-like structure, an upper through seat in said box-like structure for slidably receiving therein an end portion of said bar, locking means at said seat for locking said bar to said box-like structure, a removable and oscillatable resting foot pivotally connected to said box-like structure, a slidable plate accomodated inside said box-like structure and movable substantially parallel to said uprights, said slidable plate having a lower folded end protruding from said box-like structure for engaging an undercut edge profile of the vehicle roof, a transverse tension element extending between said pair of uprights for structural and mechanical connection thereof, an oscillatable element pivoted inside said box-like structure and having entrainment portions engageable with corresponding driving portions of said slidable plate, and a threaded member engaging with one threaded end portion of said transverse tension element and acting on said oscillatable element for causing pivoting thereof, wherein said slidable plate has two series of apertures arranged laterally thereof and side by side to define a rack tooth formation, said oscillatable element being comprised of a substantially U-shaped profiled member defining a central wall and a pair of lateral walls, each of said lateral walls having at the top portion thereof a toothed sector complementary shaped to said rack tooth formation, there being provided a return spring biasing said oscillatable element against pivoting thereof, and wherein said threaded member consists of an operating screw the head of which abuts against the central wall of said oscillatable element, whereby tightening of said operating screw initially causes transverse adjusting of said uprights with respect to said bar for transverse and mutual positioning thereof and, subsequently, after operating said locking means to lock said bar with respect to said uprights, causes rotation of said oscillatable element and of the toothed sectors thereof thereby producing vertical displacement of the slidable plates of both uprights for stable engagement of the lower folded ends thereof with said undercut profiles of the motor vehicle.

2. Device according to claim 1, wherein said box-like structure comprises, at the lower end thereof, a pair of substantially rectangular pivots, a pair of seat formations being formed in said removable resting foot for pivotally receiving said rectangular pivots, said seats being cylindrically shaped and provided with lateral bayonet openings for insertion and extraction therethrough of said pivots upon registering rotation of said resting foot with respect to an operative position thereof.

3. Device according to claim 1, wherein said resting foot comprises a pair of foot portions arranged at opposite sides of said box-like structures pivoted at the same pivotal axis of said oscillatable element.

4. Device according to claim 1, wherein each box-like structure is of light alloy and is obtained by die-casting.

5. Device according to claim 1, wherein said box-like structure is made of stamped sheet metal.

6. Device according to claim 1, wherein said locking means consists of a locking screw lockably transversly engageable with said bar.

* * * * *